Feb. 12, 1952     P. L. LOEWE     2,585,802
MEANS FOR BALANCING WHEELS
Filed Nov. 7, 1945
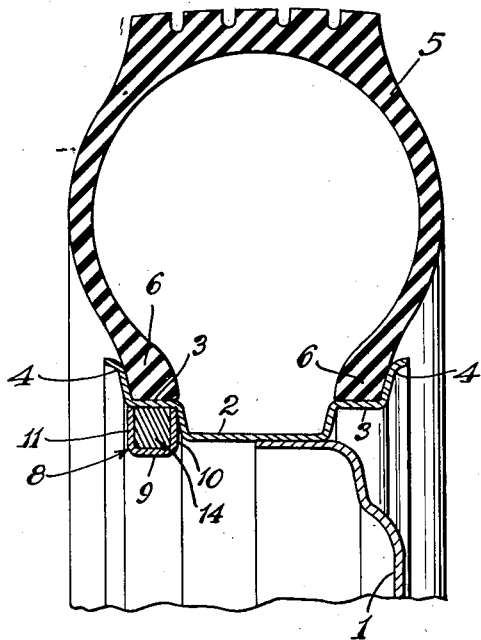
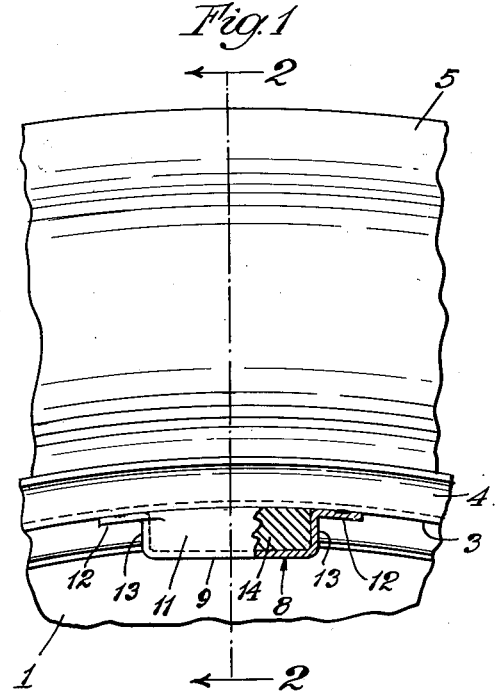
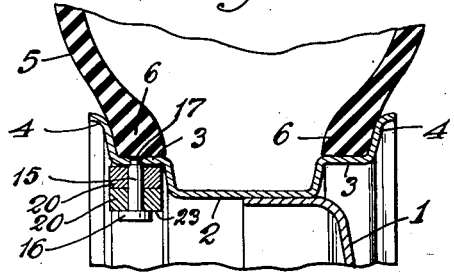
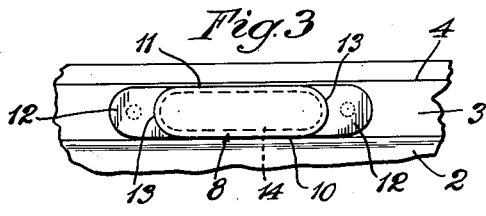
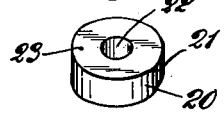
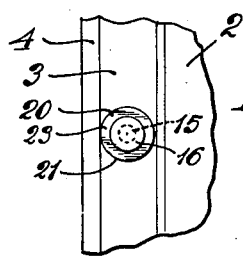
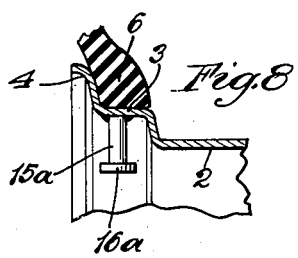
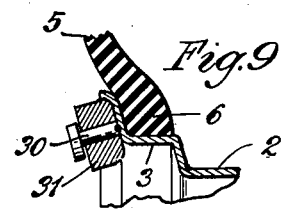
Inventor
Peter L. Loewe
by Parker Harter
Attorneys.

Patented Feb. 12, 1952

2,585,802

UNITED STATES PATENT OFFICE 2,585,802

MEANS FOR BALANCING WHEELS

Peter L. Loewe, Chicago, Ill.

Application November 7, 1945, Serial No. 627,155

1 Claim. (Cl. 301—5)

My invention relates to an improvement in counterweighting rotary members, including but not limited to vehicle wheels.

One purpose is to provide an improved counterweighting method applicable, for example, to automobile wheels.

Another purpose is to provide an improved method for locating and applying counterweights to automobile wheels.

Other purposes will appear from time to time in the course of the specification and claim.

I illustrate my invention more or less diagrammatically in the accompanying drawings.

Figure 1 is a partial side elevation with parts broken away and parts in section;

Figure 2 is a section on the line 2—2 of Figure 1;

Figure 3 is a view from below of a part of the structure shown in Figure 1;

Figure 4 is a section similar to Figure 2 illustrating a variant form of the device;

Figure 5 is a partial view from below of the structure in Figure 4;

Figure 6 is a perspective of an individual weight member;

Figure 7 is a perspective of another type of weight member;

Figure 8 is a partial section similar to Figure 4 illustrating an abutment adapted to receive the weight shown in Fig. 7; and Figure 9 is a similar section illustrating a variant form of the device.

Like parts are indicated by like symbols throughout the specification and drawings.

Referring to the drawings, I generally indicates any suitable automobile wheel having a rim generally indicated as 2, with outward tire engaging offsets 3 and rim edge or tire gripping portions 4. 5 generally indicates an entire casing having edge portions 6 shown as abutting against the rim surfaces 3 and 4. Referring first to the form of Figures 1 to 3, 8 illustrates a pocket member which may, for example, be of sheet metal and which has a bottom wall 9 and an inner wall 10, an outer wall 11 and endwise projecting ears 12. The space surrounded by the walls 9, 10 and 11 and end wall portions 13 is filled by any suitable weight 14, which may be of metal such as lead, which may be poured into the pocket thus formed, when in a molten condition, or may otherwise be inserted. It will be understood that when a predetermined or desired quantity of weight material 14 has been positioned in the pocket of the member 8, the lugs or ears 12 may be spot welded or otherwise secured to the inner face of the rim portion 3, after the user has determined where he wishes the weight to be positioned.

In the form of Fig. 4 a securing weight abutment member is illustrated, including a stem 15 and a head 16. The stem may be inserted into the rim portion at any desired position. For example a hole may be tapped in the rim 3 and the reduced inner end 17 of the stem inserted therein and then upset or otherwise secured, to hold the stem 15 fixed in position. Prior to securing the stem 15 in position one or more of the weights 20 of Fig. 6 may be threaded thereupon. Such weights may be formed in any suitable shape but I find it convenient to employ a weight having a circumferential generally cylindrical surface 21, a central aperture 22, and plane top and bottom faces 23.

It will also be understood that, if desired, the stem 15 may be applied to the portion 3 without first adding the weights, and the weight or weights 25 shown in Fig. 7 may be employed. Each such weight is provided with an open slot 26, adapted to receive the stem 15. After the weight or weights 25 have been applied to the stem, the apertures or slots 26 may be somewhat closed about the pin 15, and the weight is thereby held in position until the user wishes to remove it.

As shown in Fig. 8 the pin may be welded to the rim portion 3. In Fig. 8, I illustrate a stem 15a with its head 16a, the end of the stem being spot welded or otherwise secured directly to the portion 3. When the pin is thus welded it may be more desirable to use the weight 25 of Fig. 7 rather than the weight 20 of Fig. 6, to prevent any softening or loss of the material of the weight, lead being the preferred weight material, and being subject to melting at the heat necessary to spot weld the ends of the pin 15a to the rim portion 3.

Referring to Fig. 9, I illustrate an alternative position of the weight, the stem 30 being directly secured to the rim portion 4, instead of the rim portion 3. In that event any suitable weight 31 may be positioned against and beneath the rim portion 4, the outward flare of the rim portion 4 being effective to take any centrifugal tendency of the weight 31 to move outwardly.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

In balancing rotary members for dynamic balance it is important to determine, prior to applying a weight, the necessary mass of the weight or weights, and just where the weight or weights should be applied. Once the location of the weight, and the size or effect of the particular weight or weights necessary has been determined, the weight or weights can then be applied permanently or semipermanently to the rim or wheel. For example, a particular wheel may be tested on any suitable balance testing devices now available, and movable weights, of various mass, may be secured to the wheel or rim and moved thereabout, until the operator knows how many weights he should employ, the necessary mass of each individual weight, and the location of each individual weight. This information having been obtained, he then applies the necessary weight or weights permanently to the rim, preferably in such position that during the rotation of the wheel the centrifugal thrust is taken by the wheel or rim itself. Referring to the form of Figures 1 to 3, I illustrate a weight support in the form of a pocket, preferably of sheet metal, which may be spot welded or otherwise secured to the wheel or rim. This pocket member may be filled with a weight element 14 of the desired mass. For example a measured volume of molten lead or other suitable molten material may be poured into the pocket and permitted to harden. Or cold lead or other suitable material, cut to or formed to the proper size and shape, may be dropped into the pocket. Thereafter the pocket element as a whole is secured to the wheel rim. I find it convenient to spot weld the pocket to the rim by employing the outwardly extending ears 12. However, they may be screwed, bolted or otherwise secured.

With reference to the form of Figs. 4 to 9 inclusive, I illustrate headed stems which may be welded to the wheel or rim, or tapped into the wheel or rim, or otherwise secured to it. Either before or after the end of the stem is secured to the rim, a weight or weights of the desired mass are positioned on the stem and between the head and the opposed portion of the rim or wheel. Whereas in Figs. 5 and 7, I have illustrated two satisfactory weight forms, it will be realized that the form of the weights employed may be widely varied.

I claim:

In combination with a metal wheel rim, a weight assembly secured thereto, including a metal weight support welded to said rim and a weight of heavier metal supported by said weight support, said weight support being in the form of a container surrounding said weight and having outwardly extending portions welded to the face of the rim at points remote from said weight.

PETER L. LOEWE.

REFERENCES CITED

The following references are of record in the file of this patent:

UNITED STATES PATENTS

| Number | Name | Date |
|---|---|---|
| 1,889,577 | Tibbetts | Nov. 29, 1932 |
| 1,917,575 | Cataline | July 11, 1933 |
| 2,177,861 | Burger | Oct. 31, 1939 |
| 2,231,948 | Rickey | Feb. 18, 1941 |
| 2,313,339 | Hare | Mar. 9, 1943 |

FOREIGN PATENTS

| Number | Country | Date |
|---|---|---|
| 774,977 | France | Dec. 17, 1934 |

OTHER REFERENCES

Dynamic Balancing Simplified; Gisholt Method of Balancing Treatise #2, pages 13, 14 and 15; published by Gisholt Machine Co., Madison, Wis. Copyright 1926. Copy in 301–5B Division 45.